United States Patent Office 3,315,731
Patented Apr. 25, 1967

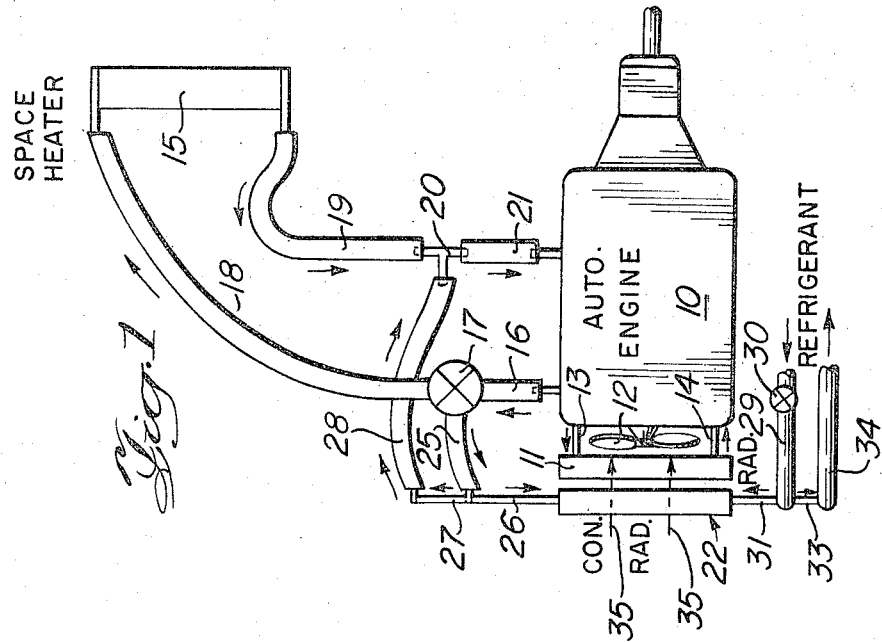
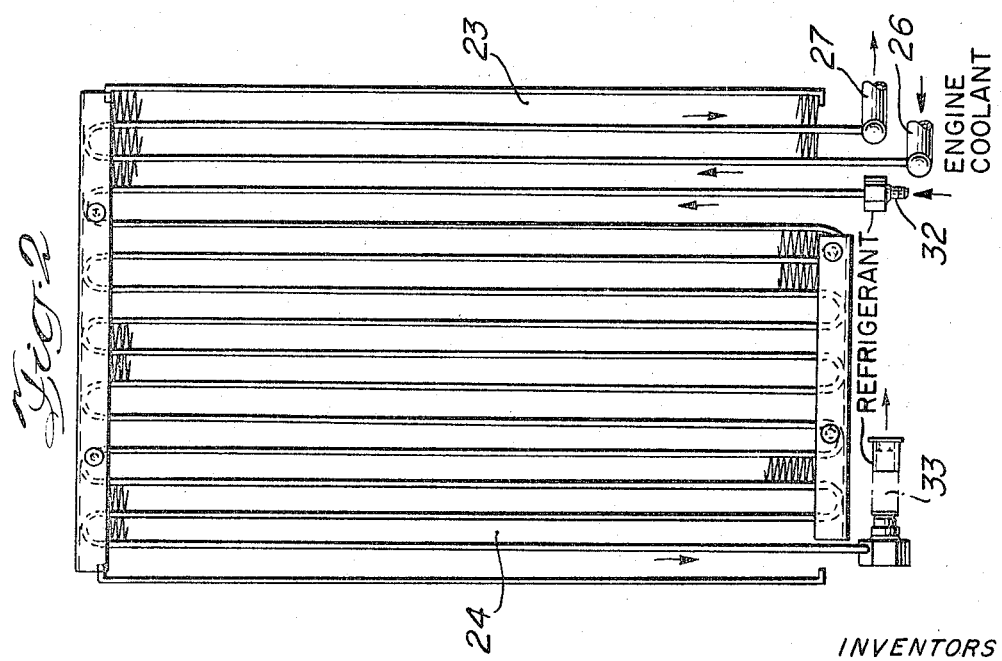

3,315,731
VEHICLE AIR CONDITIONER
Arnold E. Jensen, Racine, Wis., and Grant H. Jacobson, Dallas, Tex., assignors to Modine Manufacturing Company, a corporation of Wisconsin
Filed May 4, 1965, Ser. No. 453,103
5 Claims. (Cl. 165—42)

This invention relates to an automotive vehicle air conditioning apparatus.

It is customary in providing air conditioning for automotive vehicles such as automobiles, trucks, tractors, and the like to locate the refrigerant condenser for the air conditioning system at a convenient location in the engine compartment where it can be cooled initially by the fan that cools the liquid coolant radiator. The reason for this is that the space is available in the engine compartment, particularly in front of the radiator and the same fan that draws cooling air over the radiator can thereby draw cooling air over the condenser. It is customary to place the condenser in front of the radiator so that the cooling air first flows over the condenser and then flows over the radiator and from there into the fan.

With this arrangement the air is heated by contact with the condenser before it reaches the radiator. This places an increased cooling load on the radiator and often causes overheating and actual boiling of the liquid coolant in the engine because the radiator has insufficient cooling capacity under these circumstances to cool the engine coolant.

This is particularly true when the radiator is merely a standard size, such as often occurs where the owner of the automobile later installs an air conditioning system without converting to a radiator of larger size. This problem is not so prevalent with air conditioners installed at the factory because oridinarily the manufacturer then uses an oversize radiator.

One of the features of this invention is to provide an improved cooling system for the automotive engine and refrigerant condenser having means for increasing the cooling capacity of the radiator when the refrigerant condenser is in operation.

Other features and advantages of the invention will be apparent from the following description of one embodiment thereof taken in conjunction with the accompanying drawings. Of the drawings:

FIGURE 1 is a semi-schematic view of an automotive engine combined with a space heater and a refrigerant condenser for an air conditioning system so that the vehicle can be heated or cooled as desired.

FIGURE 2 is a fragmentary front elevational view of a heat exchanger combining the functions of an auxiliary radiator for the coolant liquid and a condenser for the air conditioning refrigerant.

In the illustrated embodiment there is illustrated a conventional automotive engine 10 having the usual liquid coolant passages (not shown) therein and an air cooled radiator 11 located in front of the engine 10 with an air moving fan 12 of the customary type driven by the engine 10 and positioned between the engine and the radiator 11. Liquid coolant passages 13 and 14 are provided to flow liquid coolant from the engine 10 through the radiator 11 which is of the customary type.

A hot liquid space heater 15 is provided for heating the interior of the automotive vehicle. Liquid is circulated from the engine 10 through the heater 15 in the customary manner when heating is desired. The flow passages in the illustrated embodiment include a conduit 16, two-way valve 17 and conduit 18 between the valve 17 and the heater 15. From the heater coolant is directed through a conduit 19, a T connection 20 and a conduit 21 back to the engine 10.

In the space in front of the radiator 11 there is provided a heat exchanger 22 that combines the functions of an auxiliary radiator 23 and a refrigerant condenser 24 as is illustrated in the embodiment of FIGURE 2.

Liquid coolant from the engine 10 may be directed as desired from the conduit 16 into the auxiliary radiator 23. This flow is provided by way of a conduit 25 leading from the valve 17 into the entrance pipe 26 to the auxiliary radiator 23. From this auxiliary radiator 23 the liquid coolant is directed by way of a similar pipe 27 through a conduit 28 and from there through the T 20 and the conduit 21 back to the engine 10.

Flow of gaseous refrigerant into the condenser 24 is provided by a conduit 29 controlled by a valve 30. When the valve 30 is opened the gaseous refrigerant flows from the conduit 29 into the condenser 24 through a pipe 31 connected to a fitting 32. From the condenser 24 the liquid refrigerant flows through a pipe 33 and from there through a conduit 34 to the refriegrant evaporator (not shown). In operation, when heating is desired the valve 17 is turned to direct hot liquid from the engine 10 through the heater 15, as previously described. When neither heating nor cooling is required, the valve 17 is shut off so that there is no flow of liquid coolant from the engine by way of the conduit 16. During each of these occasions, liquid coolant from the engine 10, of course, flows in the customary manner through the radiator 11 to be cooled by the air stream indicated by the arrows 35 set up by the fan 12.

Then, when cooling of the interior of the vehicle is desired, the valve 30 is opened to direct refrigerant through the condenser 24, as indicated, where the refrigerant is cooled by the same air 35 moved by the fan 12. Because this places an added cooling load on the radiator 11 by much of the air being heated by flow over the condenser 24 before it strikes the radiator 11, liquid coolant is directed through the auxiliary radiator 23 by way of the conduit 16, valve 17, conduit 25, pipe 26, pipe 27, conduit 28, connection 20 and conduit 21 in the manner previously described. This provides additional radiator cooling capacity for the engine 10 during the additional heat load when the condenser 24 is being used to cool hot gaseous refrigerant.

This invention is very useful to prevent overheating of the engine, particularly where the air conditioning system is being operated during hot summer temperatures and particularly in slow city driving or at idle. This problem has been so severe that where only a conventional radiator is used in conjunction with a refrigerant condenser boiling often occurs in the vehicle radiator.

Having described our invention as related to the embodiment shown in the accompanying drawings, it is our intention that the invention be not limited by any of the details of description, unless otherwise specified, but rather be construed broadly within its spirit and scope as set out in the accompanying claims.

We claim:
1. In an automotive vehicle having an engine with liquid coolant and a cooling radiator for said coolant, apparatus comprising: an auxiliary radiator for said coolant adjacent said cooling radiator; a refrigerant condenser for an air conditioning system for said vehicle also adjacent said cooling radiator; means for passing a cooling medium over said radiator, auxiliary radiator and condenser; and means for simultaneously directing refrigerant through said condenser and coolant from said engine through said radiator and auxiliary radiator, so that said auxiliary radiator supplements said radiator in cooling said coolant during cooling of said condenser.

2. The apparatus of cliam 1 wherein said means for passing cooling medium comprises a single air moving fan for cooling simultaneously said radiator, auxiliary radiator and condenser.

3. The apparatus of claim 1 wherein said auxiliary radiator and condenser are arranged as a single integral unit located adjacent said radiator, and said means for passing cooling medium comprises a single air moving fan for cooling simultaneously said unit and said radiator.

4. In an automotive vehicle having an engine with liquid coolant and a cooling radiator for said coolant, apparatus comprising: an auxiliary radiator for said coolant; a refrigerant condenser for an air conditioning system for said vehicle; means for cooling said radiator, auxiliary radiator and said condenser; means for directing said liquid from said engine through said radiator; means for directing refrigerant as desired through said condenser; a hot liquid space heater; means for flowing coolant from said engine through said heater; means for flowing refrigerant through said condenser; and means for both discontinuing coolant flow through said heater and for flowing coolant from said engine through said auxiliary radiator during said refrigerant flow through said condenser, so that said auxiliary radiator supplements said radiator in cooling said coolant during cooling of said condenser.

5. The apparatus of claim 4 wherein said auxiliary radiator and condenser are arranged as a single integral unit located adjacent said radiator, and said cooling means comprises a single air moving fan for cooling simultaneously said unit and said radiator.

References Cited by the Examiner
UNITED STATES PATENTS

| | | | |
|---|---|---|---|
| 1,745,544 | 2/1930 | Karmazin | 165—140 |
| 2,735,657 | 2/1956 | Owen | 165—30 |
| 2,806,358 | 9/1957 | Jacobs | 165—43 |

ROBERT A. O'LEARY, *Primary Examiner.*

CHARLES SUKALO, *Examiner.*